US007698356B2

(12) United States Patent
Yui (10) Patent No.: US 7,698,356 B2
(45) Date of Patent: Apr. 13, 2010

(54) SMART EVALUATION IN COMPUTER ALGEBRA

(75) Inventor: Jinsong Yui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 950 days.

(21) Appl. No.: 11/109,018

(22) Filed: Apr. 19, 2005

(65) Prior Publication Data

US 2006/0235920 A1    Oct. 19, 2006

(51) Int. Cl.
*G06F 7/38* (2006.01)
(52) U.S. Cl. ....................................... 708/446
(58) Field of Classification Search ................ 708/200, 708/277, 440, 446
See application file for complete search history.

(56) References Cited

U.S. PATENT DOCUMENTS

| | | | | |
|---|---|---|---|---|
| 6,363,407 B1 * | 3/2002 | Miyasaka et al. | ........... | 708/606 |
| 6,711,596 B1 * | 3/2004 | Coleman | .................... | 708/277 |
| 6,795,838 B1 * | 9/2004 | Kataoka | ..................... | 708/160 |
| 7,107,300 B2 * | 9/2006 | Allred | ........................ | 708/277 |

* cited by examiner

*Primary Examiner*—Chuong D Ngo
(74) *Attorney, Agent, or Firm*—Workman Nydegger (57) ABSTRACT

In a computing system, evaluating a mathematical expression in presented hierarchically according to the rules of precedence of operations, initial operations at the bottom of the hierarchy may yield values too large to be calculated conventionally, even if the ultimate value of the expression may represent a calculable value. The mathematical expression is evaluated top down to determine if portions of the mathematical expression are re-expressible to simplify the expression and avoid initial or intermediate calculations that would prevent calculation of the mathematical expression. Portions of the original mathematical expression are re-expressible by substituting known mathematical identities, applying arithmetic rules, or treating a portion of the mathematical expression as a variable on which other operations are performed. Once the mathematical expression has been re-expressed, the mathematical expression is simplified, and, if possible, its value calculated.

18 Claims, 7 Drawing Sheets

SMART EVALUATION IN COMPUTER ALGEBRA

FIELD OF THE INVENTION

The present invention generally pertains to evaluation of mathematical expressions performed by a computer, and more specifically, to a method and system for performing calculations on expressions involving or potentially yielding very large numbers.

BACKGROUND OF THE INVENTION

One of the many benefits of computers is the ability quickly to evaluate complex or lengthy mathematical expressions. What may be very time consuming or impractical for a person to compute may be rather simple for a computer to calculate. As a result, a number of computer algebra systems have been developed to allow scientists, engineers, mathematicians, students, and others to use computers to more easily calculate and solve even complex mathematical equations.

As increasingly powerful as computers have become, however, computers have their limits in terms of the magnitude of the expressions they are able to accommodate. For a personal computer, a number on the order of magnitude of $10^9$, or a number raised to the power of one billion, is too large for a typical personal computer to accommodate. A number on the order of magnitude of $10^{15}$, or a number raised to the power of a million billion, is too large for even a supercomputer to accommodate.

In addition, the capacity of a computer may limit the precision with which mathematical expressions are calculated. In most computer programs and computing environments, the precision of any calculation is limited by the word size of the computer, because the word size of the computer determines largest number that can be stored in one of the processor's registers. Arbitrary-precision arithmetic consists of a set of algorithms, functions, and data structures designed specifically to deal with numbers that can be of arbitrary size. Arbitrary-precision arithmetic is a common feature in computer algebra systems and some specific math and engineering software packages, but is rarely included in other software Unfortunately, sometimes mathematical expressions that are too large for the computer to accommodate, or that may be calculated only to an arbitrary level of precision, may represent only intermediate values that are part of a calculation. The calculation ultimately may result in a manageable number, but if an intermediate calculation is too large for the computing system to accommodate, the calculation cannot be performed.

Figure 1A:
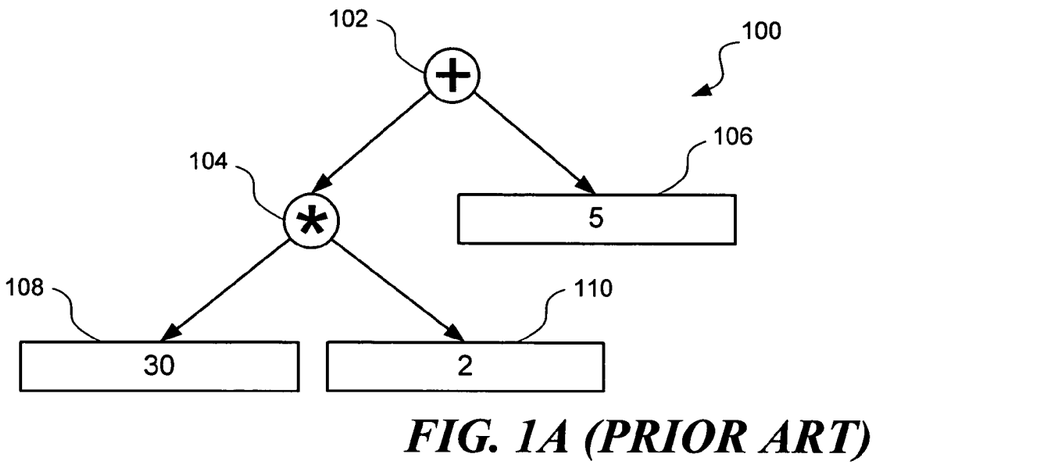
FIGS. 1A and 1B (Prior Art) are diagrams of a mathematical expression presented in a hierarchical tree structure representing how a computing system might approach the expression according to rules of precedence of operations.
Figure 1B:
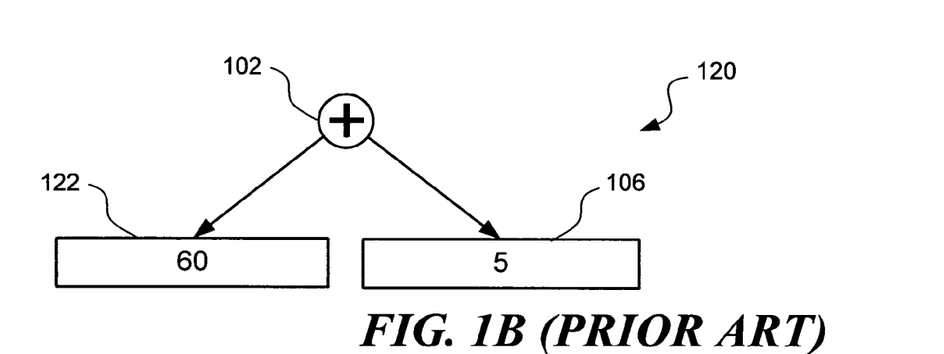
Figure 2:
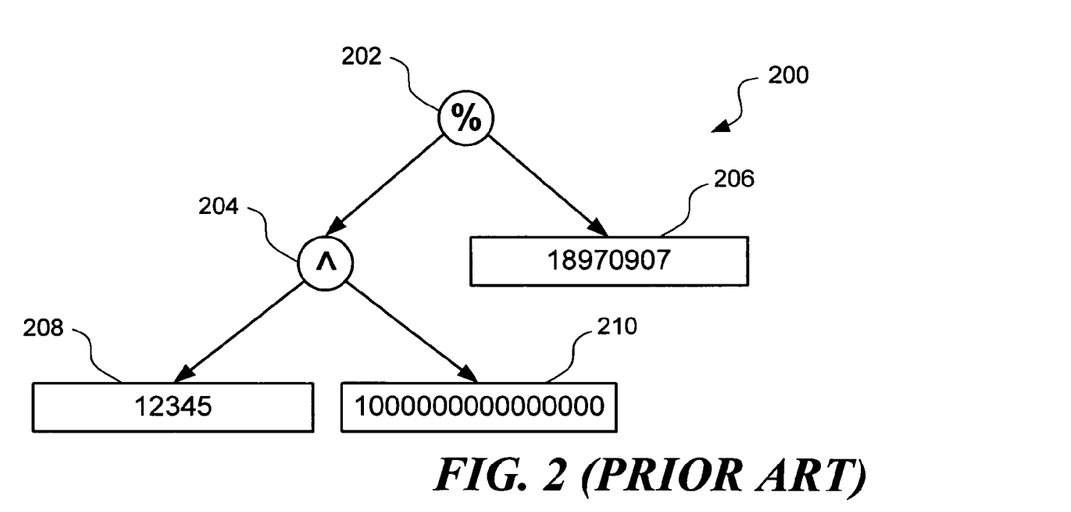
FIG. 2 (Prior Art) is a diagram of a mathematical expression that yields an intermediate product that is too large to be handled by most computing systems.

FIGS. 1A, 1B, and 2 further illustrate the concern by illustrating how a computing system calculates a mathematical expression. In FIG. 1A, mathematical expression 100 represents how a computing system evaluates the expression 30*2+5. Rules of precedence of operations dictate the form of mathematic expression 100, such that the product of 30*2 is calculated, then the sum of that product is added to 5. More particularly, as regarded in a tree structure, from top down, the addition operator 102, representing the last operation, is at the top of tree structure 100, over children including multiplication operator 104 and the value 5 106. In turn, multiplication operator has two children, value 30 108 and value 2 110. Values 30 108 and 2 110 also can be thought of as the "grandchildren" of addition operator 102, because values 30 108 and 2 110 are two steps removed from addition operator 102, in contrast to multiplication operator 104 and value 5 106 which are once removed from addition operator 102.

The value of mathematical expression 100 is calculated from the bottom up to give effect to the rules of precedence of operations. Thus, value 30 108 and value 2 110 are received and, moving up tree structure 100, are multiplied together upon reaching multiplication operator 104. Moving further up tree structure 100, the product determined from the multiplication of values 30 108 and 2 110 is received along with value 5 106. Moving up the hierarchical structure of mathematical expression 100, upon reaching addition operator 102, the product of values 30 108 and 2 110 are added to value 5 106.

Shown another way, once value 30 108 and value 2 110 are multiplied together, tree structure 100 of FIG. 1A becomes mathematical expression 120 of FIG. 1B. As the expression is calculated from the bottom up, mathematical expression 100 becomes simplified to mathematical expression 120. Thus, from the perspective of addition operator 102, only the children of addition operator 102, product 122 and value 5 106 are relevant; the children of each operator only are ever relevant, regardless of what the grandchildren of the term might be. Again, the hierarchical tree structure is created based on rules of precedence of operations, and the tree is calculated from the bottom up.

Unfortunately, sometimes the conventional approach cannot calculate an expression that, although manageable on the whole, includes one or more steps that the computing system is unable to calculate. For example, FIG. 2 illustrates a mathematical expression 200 representing how a computing system would calculate the expression $12345^{1000000000000000}$% 18970907, where "%" represents the modulus division operator. In tree structure 200, the modulus division operator 202 has children that include the exponential operator 204, which in turn has children base 12345 208 and exponent 1000000000000000 210, and quotient 18970907 204. The result of modulus division yields a result which, at most, is one less than the quotient or, in the example of FIG. 2, is quotient 18970906 206. This is a value that is manageable within even a simple computing system. By contrast, however, calculating the expression $12345^{1000000000000000}$ would overwhelm even most supercomputers. Accordingly, even though the overall result of the expression represented by mathematical expression 200 is manageable, processing of mathematical expression 200 ends at the calculation of $12345^{1000000000000000}$.

It would therefore be desirable to provide a method and system for a computing system to automatically calculate the result of mathematical expressions when the overall result of the mathematical expression is manageable by the computing system, even when the mathematical expression includes a calculation the computing system is not able to accommodate.

SUMMARY OF THE INVENTION

One advantage of the present invention is that it provides a method and a system for re-expressing a presented mathematical expression such that calculations included in the mathematical expression that may be unmanageable or impossible may be simplified to enable the mathematical expression to be calculated or simplified. Conventional computing methods and systems, to give effect to rules of precedence of operations, conceive of mathematical expressions in a hierarchical tree structure, where the first operations to be performed are situated at the bottom of the tree structure, and the value of the tree structure is calculated from the bottom up. Initial calculations might present calculations that are very lengthy or possibly too large to be calculated by conventional computing means. However, according to an embodiment of the present invention, the mathematical expression is reconsidered from the top down, allowing for the possibility that the mathematical expression may be simplified to avoid complex or impossible calculations. Applying known mathematical simplifications and identities, or treating incalculable portions of expressions as variables, it becomes possible to calculate or, at least, simplify the mathematical expression, even when the first operation to be performed might prove too large for the computing system to calculate.

One aspect of the present invention is thus directed to a method of calculating a presented mathematical expression including at least one first operation and a second operation where the first operation is calculated before the second expression according to rules of precedence of operators. The second operation is evaluated to determine if a combination of the second operation acting on the at least one first operation is replaceable with a mathematically identical expression that involves reduced computational effort to calculate than the presented mathematical expression. The combination of the second operation acting on the at least one first combination is re-expressed with the mathematically identical expression. The mathematically identical expression is then calculated.

The at least one first operation may be evaluated to determine if the first operation will result in a computational effort exceeding a predetermined computational effort threshold before evaluating the second operation.

Re-expressing the combination with the mathematically identical expression includes replacing the combination with a mathematically identical expression that replaces computation of values with computation of smaller values. For example, re-expressing the combination with the mathematically identical expression may include re-expressing $n^k \% m$ with $((a \% m)*(b \% m)) \% m$, where % represents a modulus division operator, $n^k$ represents the first operation, % m represents the second operation, a and b are factors of $n^k$. The combination includes $n! \% m$ may be re-expressed as zero, where % represents a modulus division operator, $n!$ represents the first operation, % m represents the second operation, and $m <= n$. The combination $(n-1)! \% n$ may be re-expressed as $n-1$, where % represents the modulus division operator, $(n-1)!$ represents the first operation, % n represents the second operation, and n is a prime number. The combination $(n-1)! \% n$ may be re-expressed as zero, where % represents the modulus division operator, $(n-1)!$ represents the first operation, % n represents the second operation, and n is neither a prime number nor equal to four. The combination $\log(b, b^n)$ may be re-expressed as n, where $b^n$ represents the first operation, $\log(b, b^n)$ represents the second operation, b is a positive real number and n is an integer. The combination $\log(b, b^n)$ may be re-expressed as $-1$, where $b^n$ represents the first operation, $\log(b, b^n)$ represents the second operation, and n is negative one. The combination $\log(b^n, b)$ may be re-expressed as $1/n$, where $b^n$ represents the first operation, $\log(b^n, b)$ represents the second operation, b is a positive real number and n is an integer. The combination $\log(b^m, b^n)$ may be re-expressed as $n/m$, where $b^m$ and $b^n$ represent the first operation, $\log(b^m, b^n)$ represents the second operation, and m is nonzero. The combination $\gcd(m, n)$ may be re-expressed as $\gcd(m, n \% m)$, where gcd represents a greatest common divisor operation, n represents the first operation, and $\gcd(m, n)$ represents the second operation). The combination $n!/m!$ may be re-expressed as $n*(n-1)*(m+1)$, where $n > m$, $n!$ and $m!$ represent the first operation, and $n!/m!$ represents the second operation. The combination of permutation$(m, n)$ may be re-expressed as $n!/(n-m)!$, where m and n represent the first operation, and permutation$(m, n)$ represents the second operation.

In addition, the combination may be re-expressed according to arithmetic rules, including re-expressing n−n as zero and n/n as one, when n is nonzero. Alternatively, re-expressing the combination may include cascading the second operation down to redistribute the first operation to replaces computation of values with computation of smaller values.

Re-expressing the combination with the mathematically identical expression also may include includes treating the first operation as a variable and computing a remainder of the mathematical identical expression to yield a simplified expression in as applied to the first operation. Once the simplified expression is reached, an attempt may be made to calculate the value of the simplified expression as applied to the first operation.

Re-expressing the mathematical expression may include iteratively evaluating each additional operation that is presented by the presented mathematical expression, or the mathematically identical expression resulting from the re-expressing of the presented mathematical expression.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 3:
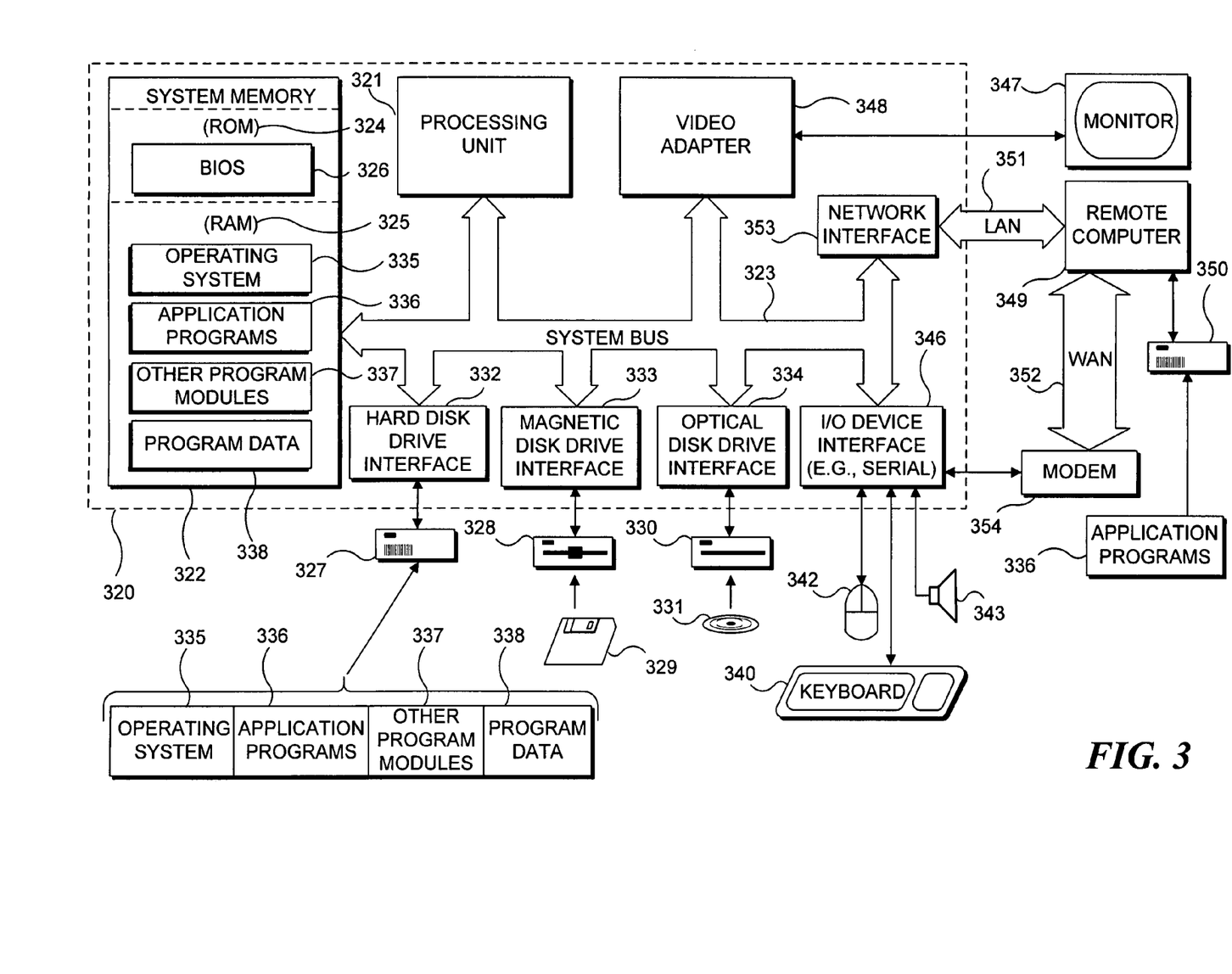
FIG. 3 is a functional block diagram of a computing device or personal computer (PC) adaptable to use an embodiment of the present invention.

With reference to FIG. 3, an exemplary conventional computing system suitable for use with an embodiment of the present invention is shown. The system includes a general purpose computing device in the form of a PC 320, provided with a processing unit 321, a system memory 322, and a system bus 323. The system bus couples various system components including the system memory to processing unit 321 and may be any of several types of bus structures, including a memory bus or memory controller, a peripheral bus, and a local bus using any of a variety of bus architectures. The system memory includes read only memory (ROM) 324 and random access memory (RAM) 325. A basic input/output system 326 (BIOS), containing the basic routines that help to transfer information between elements within the PC 320, such as during start up, is stored in ROM 324. PC 320 further includes a hard disk drive 327 for reading from and writing to a hard disk (not shown), a magnetic disk drive 328 for reading form or writing to a removable magnetic disk 329, and an optical disk drive 330 for reading from or writing to a removable optical disk 331, such as a compact disk-read only memory (CD-ROM) or other optical media. Hard disk drive 327, magnetic disk drive 328, and optical disk drive 330 are connected to system bus 323 by a hard disk drive interface 332, a magnetic disk drive interface 333, and an optical disk drive interface 334, respectively. The drives and their associated computer readable media provide nonvolatile storage of computer readable machine instructions, data structures, program modules, and other data for PC 320. Although the exemplary environment described herein employs a hard disk, removable magnetic disk 329, and removable optical disk 331, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 329, optical disk 331, ROM 324, or RAM 325, including an operating system 335, one or more application programs 336, other program modules 337, and program data 338. A user may enter commands and information in PC 320 and provide control input through input devices, such as a keyboard 340 and a pointing device 342 that communicate with system bus 323 via I/O device interface 346. Pointing device 342 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. One or more audio input/output devices 343, including headsets, speakers, and microphones, also engage personal computer 320 via I/O device interface 346. Still further input devices (not shown) may include a joystick, haptic joystick, yoke, foot pedals, game pad, satellite dish, scanner, or the like. These and other input/output (I/O) devices are often connected to processing unit 321 through an I/O interface 346 that is coupled to the system bus 323. The term I/O interface is intended to encompass each interface specifically used for a serial port, a parallel port, a game port, a keyboard port, and/or a universal serial bus (USB). A monitor 347 is connected to system bus 323 via an appropriate interface, such as a video adapter 348. It will be appreciated that PCs are often coupled to other peripheral output devices (not shown), such as speakers (through a sound card or other audio interface—not shown) and printers.

PC 320 can also operate in a networked environment using logical connections to one or more remote computers, such as a remote computer 349. Remote computer 349 may be another PC, a server (which is typically generally configured much like PC 320), a router, a network PC, a peer device, or a satellite or other common network node, and typically includes many or all of the elements described above in connection with PC 320, although only an external memory storage device 350 has been illustrated in FIG. 3. The logical connections depicted in FIG. 3 include a local area network (LAN) 351 and a wide area network (WAN) 352. Such networking environments are common in offices, enterprise wide computer networks, intranets, and the Internet.

When used in a LAN networking environment, PC 320 is connected to LAN 351 through a network interface or adapter 353. When used in a WAN networking environment, PC 320 typically includes a modem 354, or other means such as a cable modem, Digital Subscriber Line (DSL) interface, or an Integrated Service Digital Network (ISDN) interface for establishing communications over WAN 352, such as the Internet. Modem 354, which may be internal or external, is connected to the system bus 323 or coupled to the bus via I/O device interface 346, i.e., through a serial port. In a networked environment, program modules, or portions thereof, used by PC 320 may be stored in the remote memory storage device. It will be appreciated that the network connections shown are exemplary and other means of establishing a communications link between the computers may be used, such as wireless communication and wide band network links.

Re-expressing Mathematical Expressions to Avoid Excessive Computational Demands

Figure 4A:
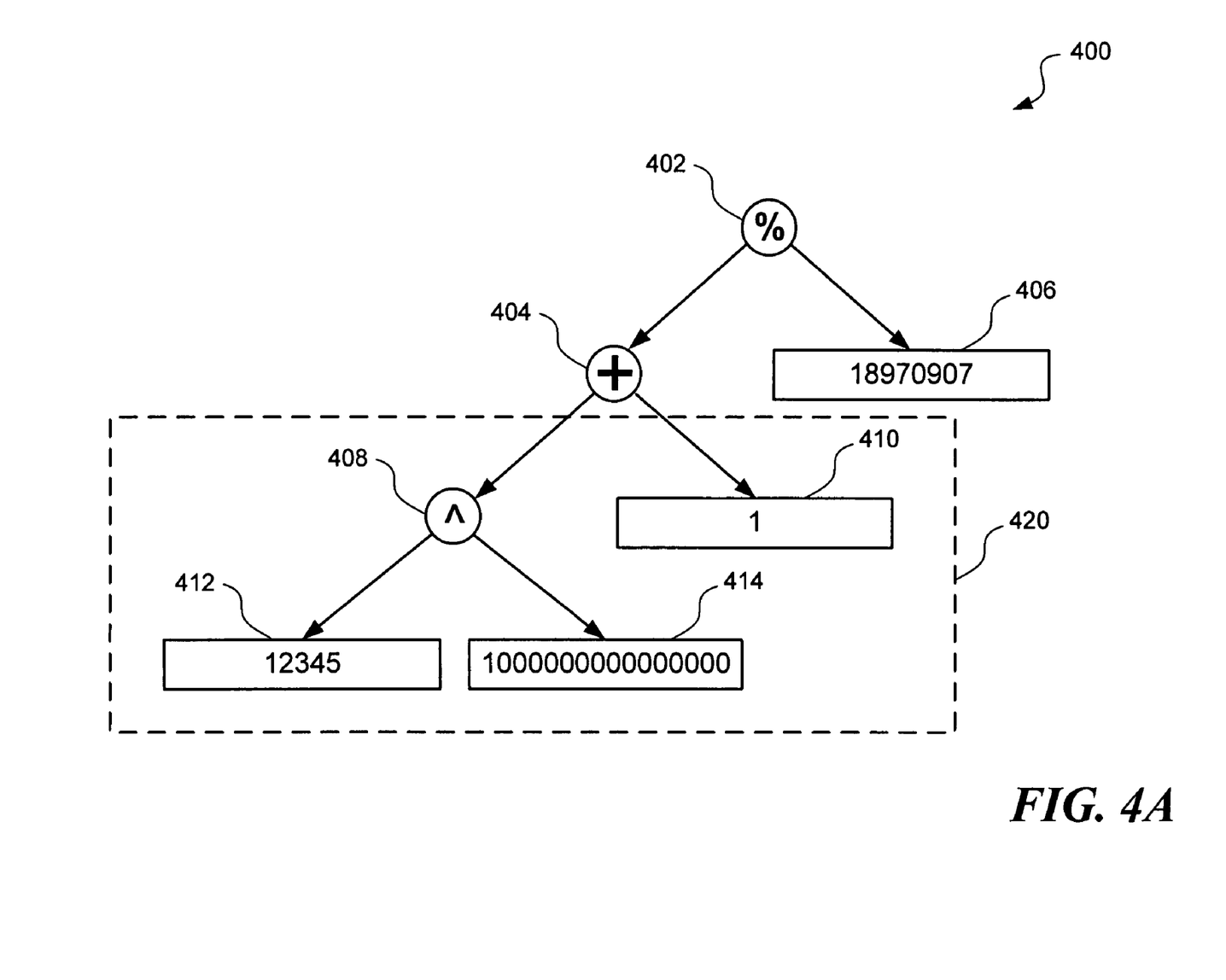
FIGS. 4A, 5A, and 6A are mathematical expressions represented in a hierarchical form suitable for processing by a computing system where each of the mathematical expressions would yield an intermediate result too large to be calculated by conventional computing systems.

FIG. 4A shows a block diagram of a mathematical expression 400. Mathematical expression 400 yields a relatively small number, or at least a number small enough such that it would not overload a personal computer. Mathematical expression 400 performs modulus division by a quotient of 18970907 406. Because modulus division yields the remainder of division by the quotient, the result will be a value between zero and one less than the quotient, or, in this case, one less than 18970907 406. A value of up to one less than quotient 1897907 406 is a manageable number for a calculator, let alone a computer.

However, even though the result of mathematical expression 400 is manageable, mathematical expression is not because of the large values that would have to be calculated to calculate mathematical expression 400. Modulus division operator 402 is performed on a sum resulting from application of addition operator 404 to exponential operator 408 raising base 12345 to exponent 1000000000000000 414 and value 1 410. Calculation of base 12345 412 raised to exponent 1000000000000000 414 will overflow personal computers as well as larger computers, even if the ultimate result of mathematical expression 400 is a manageable value.

Figure 4B:
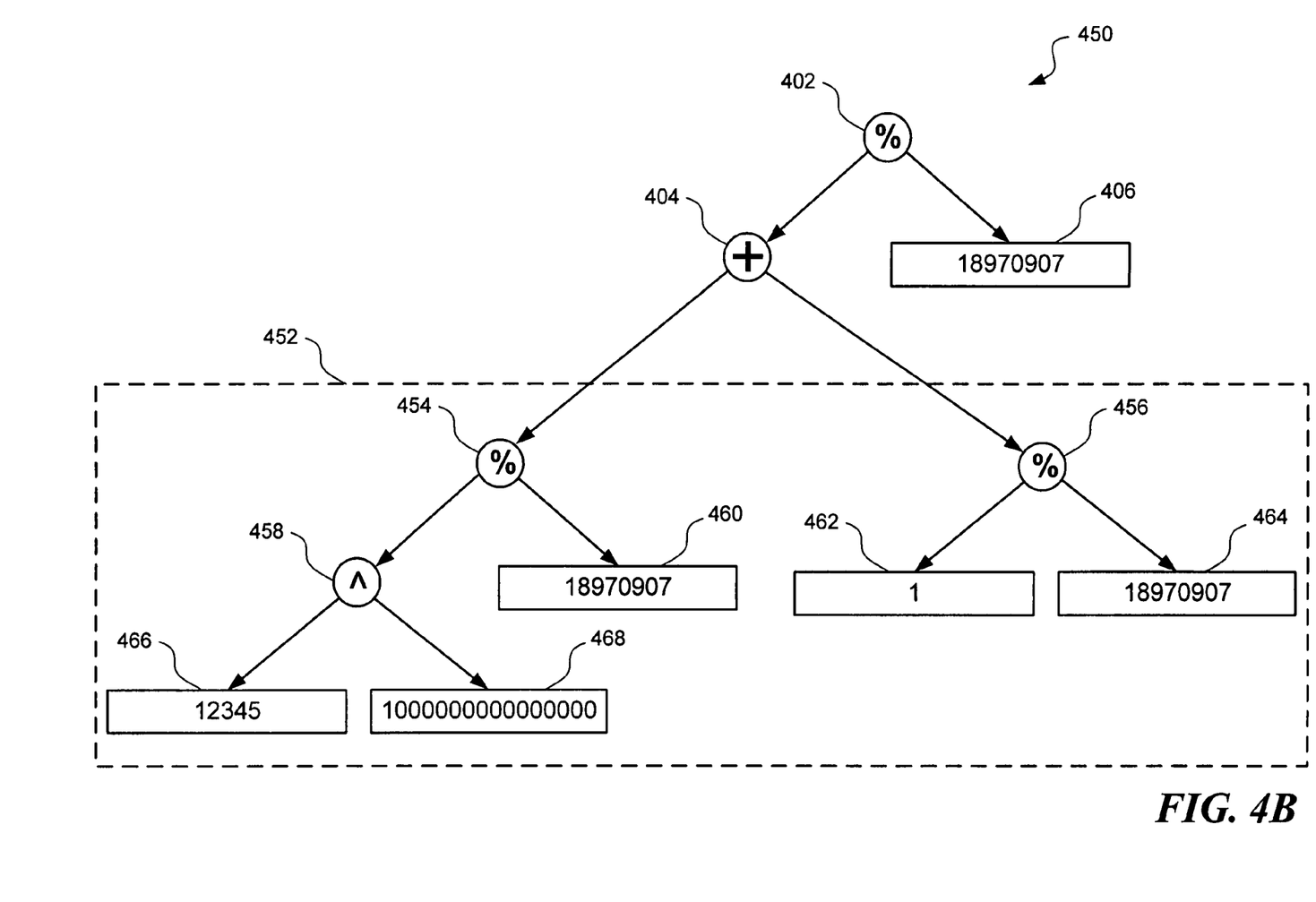
FIGS. 4B, 5B, and 6B are the mathematical expressions of FIGS. 4A, 5A, and 6A, respectively, re-expressed according to embodiments of the present invention allowing the mathematical expressions to be simplified or calculated by typical computing systems.

According to an embodiment of the present invention, upon encountering a value that is too large to be calculated by the computing system, the computing system further evaluates mathematical expression 400 to determine whether mathematical expression may be re-expressed in a way that allows for mathematical expression to be computed. As shown in FIG. 4A, mathematical expressions are logically represented in a top-down, tree fashion where operations to be performed first according to the rules of precedence of operators are presented at the bottom of the tree. (Alternatively, in other words, in mathematical expression of FIG. 4A, modulo operator 402 is a parent of which addition operator 404 and value 18970907 406 are children, of which exponential operator 408 and value 1 410 are grandchildren, and of which base 12345 412 and exponent 1000000000000000 414 are great-grandchildren.) In mathematical expression 400, considering the tree structure of mathematical expression 400 from the bottom up, base 12345 412 raised by exponential operator 408 to exponent 1000000000000000 414 is recognized as yielding a value too large to be computed. Thus, according to an embodiment of the present invention, another way to express the overly computation is sought. In particular, because a bottom-up analysis of the tree of mathematical expression 400 is not calculable, mathematical expression is reconsidered from a top-down approach.

Despite the fact that mathematical expression 400 is not calculable using a conventional bottom-up approach, using a top-down approach, mathematical expression 400 is calculable. Modulus division operator 402 is "cascadable," such that it can be distributed down the tree structure of mathematical expression 400. Cascading modulus division operator 402 down through the tree structure allows for values otherwise too large to be calculated to be replaced with calculable expressions that yield the same result according to algebraic identities, thereby rendering mathematical expression 400 calculable. Thus, as will be described in connection with FIG. 4B, subsidiary portion 420 of mathematical expression 400 may be expressed in a form allowing mathematical expression 400 to be calculated.

In FIG. 4B, mathematical expression 400 (FIG. 4A) is rewritten in an algebraically identical form 450. More specifically, because modulus division operator 402 is cascadable beyond addition operator 404 so that subsidiary portion 420 of mathematical expression 400 is replaced by subsidiary expression 452. Modulus division operator 402 is cascadable down to children of addition operator 404 to replace subsidiary portion 420 of mathematical expression with two modulus division operations, because of identity (1):

$$(a^b+c)\%d = ((a^b\%d)+(c\%d))\%d \quad (1)$$

Furthermore, where $a^b$ may yield a large value, as in the case of base 12345 466 raised by exponential operator 458 to exponent 468, calculation of that potentially large value is avoidable according to identity (2):

$$x^y\%z = (x\%z)^y\%z \quad (2)$$

Thus, where z is a considerably smaller number than x, the result of x % z will be no more than one less than z, thus (x % z)$^y$ will be a manageable number to calculate. Moreover, even if x or y are large numbers such that $x^y$ yields a large number, calculation of the mathematical expression can be simplified according to identity (3) where the sum of a and b is equal to y:

$$x^y = x^{(a+b)} = x^a * x^b \quad (3)$$

Furthermore, where m and n are factors of $x^y$, $x^y$ is re-expressible as:

$$x^y = (mn)\%z = ((m\%z)*(n\%z))\%z \quad (4)$$

Thus, combining identities (2), (3) and (4), for even large values of x or y, the expression $x^y$ % z can be expressed according to identity (5):

$$x^y\%z = x^{(a+b)}\%z = ((x^a\%z)*(x^b\%z))\%z = (((x\%z)^a\%z)*((x\%z)^b\%z))\%z \quad (5)$$

As a result of successively applying this identity multiple times, the expression is re-expressible in a form that is manageable for the computer to calculate. Using identity (2) and other "smart evaluation functions," even for large values of x and y, the expression $x^y$ % z is calculable as long as z includes a figure not having more than a few hundred decimal digits.

In the case of mathematical expression 400 ending upon a computing system encountering the untenable prospect of having to calculate base 12345 466 raised by exponential operator 458 to exponent 1000000000000000 468, the cascading of modulus division operator 454 allows for reformulating portion 420 (FIG. 4A) of mathematical expression 400 as portion 452 (FIG. 4B) of mathematical expression 450.

Thus, according to an embodiment of the present invention, instead of calculating mathematical expressions from the bottom up and stopping upon encountering a portion of the expression, the mathematical expression is reevaluated from the top down to determine if any portion of the mathematical expression is rewritable in a manageable form calculable by the computing system.

There are a number of additional algebraic expressions including multiple, sequential operations that, when evaluated from the bottom up, yield a result too large to be calculated by the computing system. However, according to embodiments of the present invention, reevaluating these multiple operator expressions other than strictly from the bottom up allows these expressions to be reformed in a manageable, calculable form, as listed in Table (1):

TABLE 1

| Function | Simplification and Reduction in Computational Burden |
|---|---|
| n! % m | When m <= n, the result of the expression will always be zero; result of the expression also will always be zero if all prime factors of m are less than n. n! need not be calculated. |
| (n − 1)! % n | Result of expression will be n − 1 if n is a prime number, and 0 if n is neither 4 nor a prime number. n! need not be calculated. |
| log(b, b^n) | Result of expression is n where b is a positive real number and n is any integer; alternatively, if n = −1, the expression becomes log(b, 1/b) = −1; Neither b^n nor log(b, b^n) need be calculated. |
| log(b^n, b) | Result of expression is 1/n where b is a positive real number and n is any integer. Neither b^n nor log(b^n, b) need be calculated. |
| log(b^m, b^n) | Result of expression is n/m where m is nonzero. None of the expressions b^m, b^n, or log(b^m, b^n) need be calculated. |
| gcd(m, n) | Result of greatest common divisor (gcd) of m and n is equivalent to gcd(m, n % m). Expression represented by n need not be calculated, and thus is useful for large n but m includes a manageable value. |
| n!/m! | Result of n!/m! is n * (n − 1) * (m + 1) if n > m, n − m is a small integer; useful when n! will result in an unmanageably long calculation |
| permutation (m, n) | Result of permutation (m, n) = n!/(n − m)!. Permutation (m, n) need not be calculated. |
| common arithmetic | Some expressions in common arithmetic, such as n − n, n/n (for nonzero values of n), are replaceable with simple identities because, for example, n − n = 0, n/n = 1, etc. Value of n, however expressed, need not be calculated. |

In sum, if an unmanageable expression is detected in calculating an expression from the bottom up, reevaluating the expression from the top down may allow the mathematical expression to be re-expressed. Re-expression of the mathematical expression may result in the unmanageable calculation being replaced with a simpler, more manageable calculation, or render the computation of the unmanageable portion of the calculation unnecessary.

Treating Values as Variables to Avoid Excessive Computational Demands

Figure 5A:
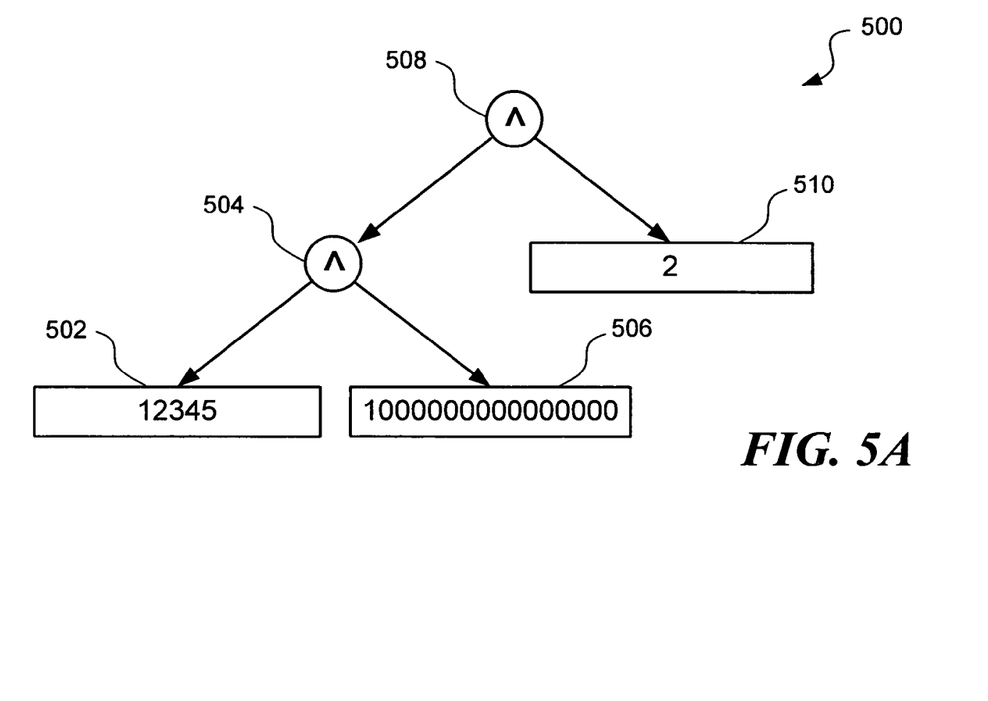

FIG. 5A shows a mathematical expression 500, formatted for processing by a computing system, of $(12345^{1000000000000000})^2$. Mathematical expression 500 includes a base 12345 502 raised by exponential operator 504 to exponent 1000000000000000 506, the result of which is raised by exponential operator 508 to exponent 2 510. As in the case of the preceding example of mathematical expression 400 (FIG. 4A), calculating mathematical expression 500 from the bottom up may result in a value too large to be calculated by a computing system. Conventional computer algebraic systems typically would stop the calculation, and return mathematical expression 500 in the original form $(12345^{1000000000000000})^2$ presented because the computing system will not be able to calculate the value of mathematical expression.

However, according to an embodiment of the present invention, upon encountering an incalculable expression, if some portion or all of the incalculable expression is replaced with a variable, the remaining steps in the calculation may be performable. As a result, although the entire calculation may not be performable, a partially calculated expression is presented to the user.

Figure 5B:
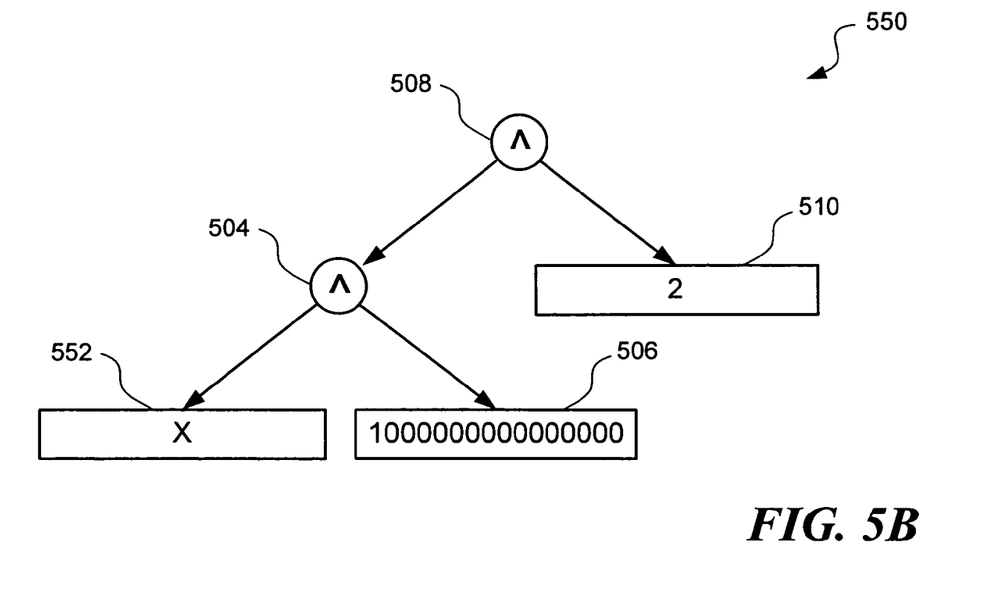

FIG. 5B illustrates how an embodiment of the present invention may re-express mathematical expression 500 (FIG. 5A) as mathematical expression 550. Because calculation of base 12345 502 (FIG. 5A) raised by exponential operator 504 to exponent 1000000000000000 506 will overwhelm even significant computing systems, according to an embodiment of the present invention, base 502 is replaced with a variable x 552 instead of uselessly attempting to calculate $12345^{1000000000000000}$. Accordingly, replacing $(12345^{1000000000000000})^2$ with $(x^{1000000000000000})^2$. Base x 552, raised by exponential operator 504 to exponent 1000000000000000 506, in turn raised by exponential operator 508 to exponent 2 510, yields the result $x^{2000000000000000}$. In turn, replacing base x 552 with original base 12345 502 yields a final result of $12345^{2000000000000000}$. Thus, although a final, quantitative value of original mathematical expression 500 is not yielded, a partially calculated result is provided.

Figure 6A:
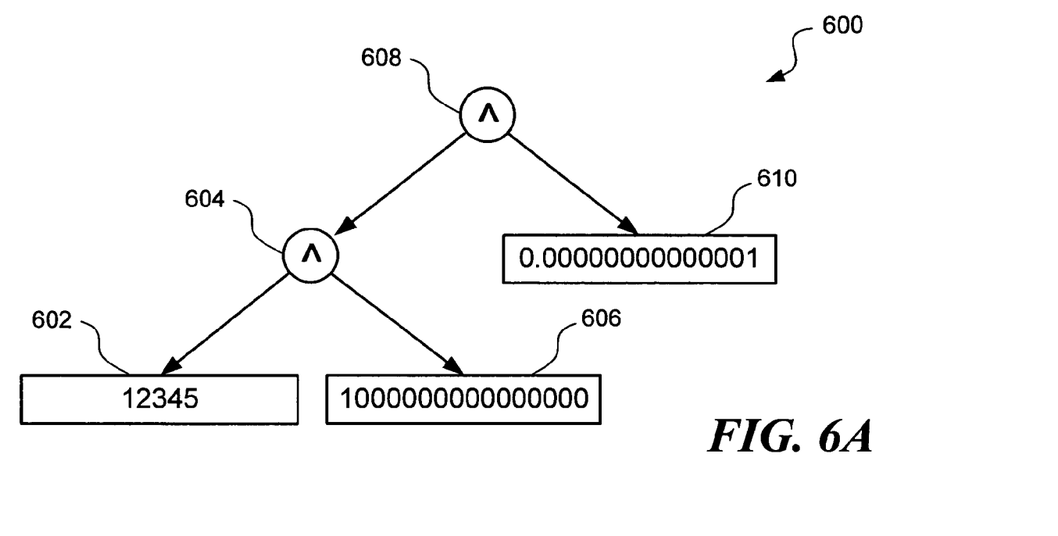

Depending on the expression being calculated, a final quantitative result may be obtainable. FIG. 6A shows a mathematical expression 600, formatted for processing by a computing system, of $(12345^{1000000000000000})^{0.00000000000001}$. Mathematical expression 600 includes a base 12345 602 raised by exponential operator 604 to exponent 1000000000000000 606, the result of which is raised by exponential operator 608 to exponent 0.00000000000001 610. As in the case of the preceding example of mathematical expressions 400 (FIG. 4A) and 500 (FIG. 5A), calculating mathematical expression 600 from the bottom up may result in a value too large to be calculated by a computing system. Conventional computer algebraic systems typically would stop the calculation, and return mathematical expression 600 in the original form $(12345^{1000000000000000})^{0.00000000000001}$ presented because the computing system will not be able to calculate the value of mathematical expression.

Figure 6B:
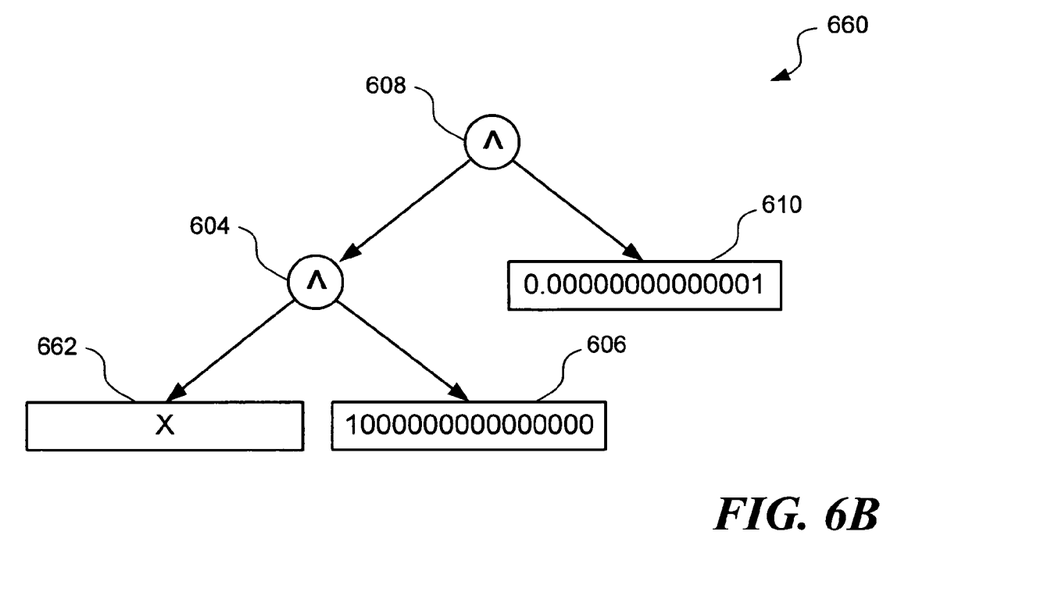

FIG. 6B, comparable to FIG. 5B, illustrates how an embodiment of the present invention may re-express mathematical expression 600 (FIG. 6A) as mathematical expression 650. Because calculation of base 12345 602 (FIG. 5A) raised by exponential operator 604 to exponent 1000000000000000 606 will overwhelm even significant computing systems, according to an embodiment of the present invention, base 602 is replaced with a variable x 652 instead of uselessly attempting to calculate $12345^{1000000000000000}$. Accordingly, replacing $(12345^{1000000000000000})^{0.00000000000001}$ with $(x^{1000000000000000})^{0.00000000000001}$. Base x 652, raised by exponential operator 604 to exponent 1000000000000000 606, in turn raised by exponential operator 608 to exponent 0.00000000000001 610, yields the result $x^{10}$. In turn, replacing base x 652 with original base 12345 602 yields the simplified expression $12345^{10}$. The expression $12345^{10}$ is a very manageable calculation, yielding the result 8220740564632746179495463429156055664 0625. Thus, replacing a portion of a mathematical expression that may yield a large, unmanageable value with a variable, the remainder of the calculation can be completed, potentially yielding a simple quantitative result.

In sum, by replacing a portion of a mathematical expression that may yield a very large, incalculable result may allow a computing system to calculate the remaining portions of the expression to simplify the expression or yield a quantitative result.

Process of Re-expressing Mathematical Expressions to Permit Computation

Figure 7:
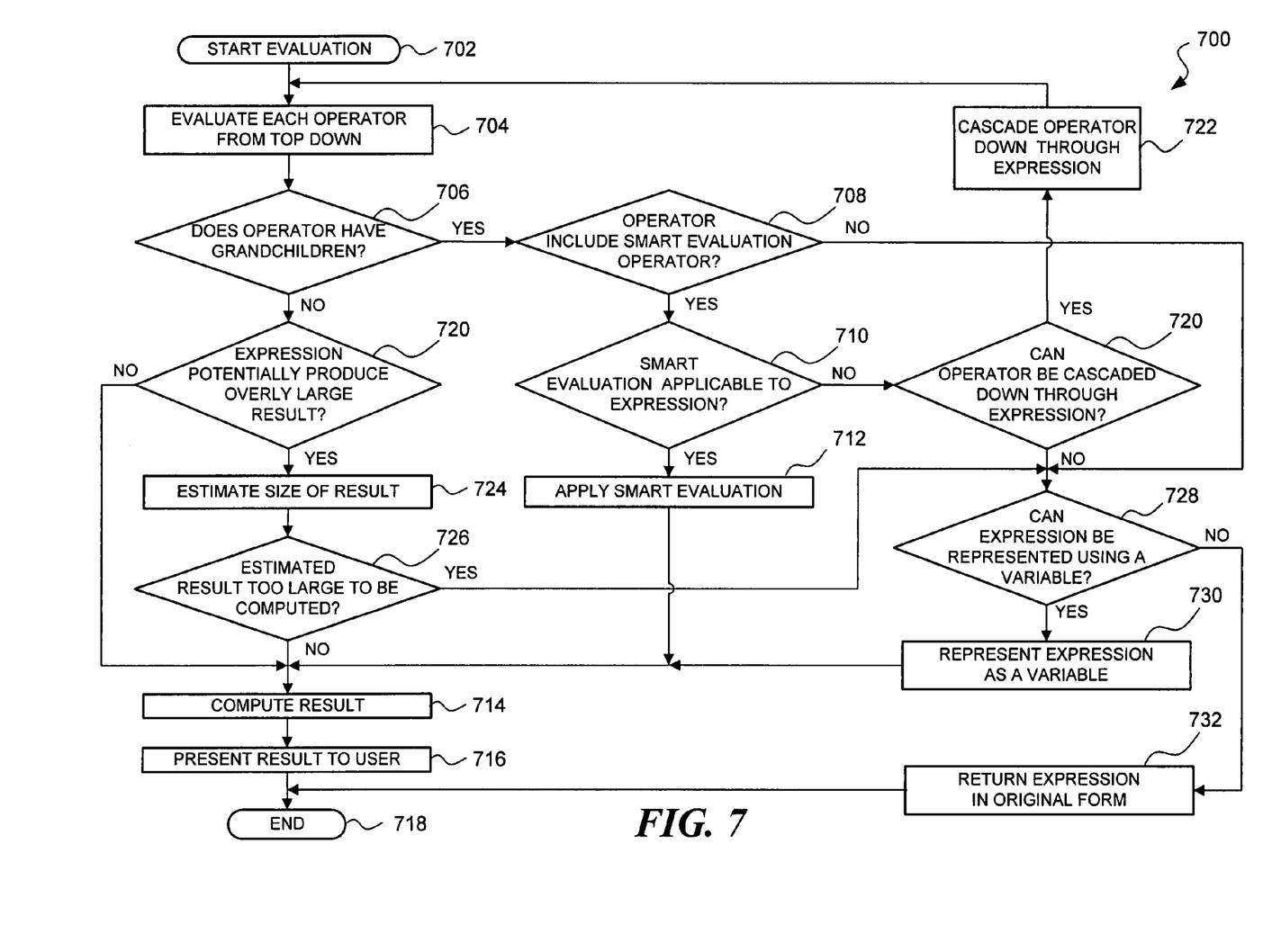
FIG. 7 is a flow diagram illustrating the logical steps for adapting mathematical expressions according to an embodiment of the present invention allowing the expressions to be processed by a typical computing system.

FIG. 7 is a flow diagram 700 illustrating the logical steps of an embodiment of the present invention for evaluating and, if necessary, re-expressing a mathematical expression so that the expression may be calculated when conventional computation of the expression would generate values too large to be processed by a conventional computing system. At step 702, evaluation of the expression begins. At step 704, instead of evaluating expressions from the bottom up, as is the practice with conventional computer algebra systems, the expression is evaluated from the top down. At decision step 706, for each operator, children of the operator are evaluated to determine if the operator has any grandchildren. For example, referring to FIG. 4A, for modulus division operator 402, addition operator 404 and quotient 18970907 406 are children of modulus division operator 402, while exponential operator 408 and value 1 410 are grandchildren of modulus division operator 402.

If it is determined at decision step 706 that the operator has grandchildren, at decision step 708, it is determined if the operator includes a smart evaluation operator, such as those previously discussed in connection with FIG. 4A and Table (1). If so, at decision step 710, it is determined if smart evaluation is applicable to the operator. If it is determined at decision step 710 that smart evaluation is applicable to the operator, at step 712, smart evaluation is applied to the operator to eliminate potentially incalculable terms. At step 714, the result is computed, and at step 716, the result is presented to the user. At step 718, flow diagram 700 ends.

Alternatively, if it is determined at decision step 710 that a smart evaluation function is not applicable to the operator, at decision step 720, it is determined if the operator can be cascaded downward through expression, as modulus division operator 402 (FIG. 4A) was cascaded down through the mathematical expression 450 in FIG. 4B, thereby simplifying the task of computing the expression. If so, at step 722, the operator is cascaded down through the expression, and flow diagram 700 loops to step 704 to evaluate the next operator potentially to further simplify the expression. It should be appreciated that the logical steps of flow diagram 700 are performed recursively as needed to fully simplify the entire mathematical expression presented for calculation.

On the other hand, if it is determined at decision step 720 that the operator cannot be cascaded down through the expression, at decision step 728, it is determined if the expression including the operator can be represented as an operation on a variable, as described in connection with FIGS. 5A-6B. If so, at step 730, the expression is re-expressed as an operation performed on a variable, and at step 714, the result is computed by simplifying or, if possible, completely calculating the expression as previously described. At step 716, the result is presented to the user, and at step 718, flow diagram ends. Alternatively, if at decision step 728 it is determined that the expression cannot be represented as an operation performed on a variable, at step 732, the expression is returned in its original form, and, at step 718, flow diagram 700 ends.

If it is determined at decision step 706 that the operator does not have grandchildren, at decision step 720, it is determined if the expression potentially will produce results that are too large to be calculated. If not, flow diagram 700 proceeds to step 714, where the result of the expression is calculated. If so, at step 724, an attempt to estimate the size of the result is made. At decision step 726, it is determined if the estimated result is too large to be computed. If so, flow diagram 700 progresses to decision step 728, where it is determined if the expression can be represented as an operation performed on a variable, as previously described. On the other hand, it is determined that the estimated result is not to large to be calculated, the result is calculated at step 714.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. At a computer system including a processor and system memory, a computer-implemented method of calculating a presented mathematical expression in a math software application, where the presented mathematical expression includes at least one first operation and a second operation where the first operation is calculated before the second operation according to rules of precedence of operators, the math software application being configurable to provide mathematically identical expressions that permit the computer system to perform calculations that are otherwise unmanageable by the computer system, the method comprising the steps of:
   evaluating the second operation using at least one of the processor and system memory to determine if a combination of the second operation acting on the at least one first operation is replaceable with a mathematically identical expression that involves reduced computational effort to calculate than the presented mathematical expression;
   re-expressing the combination of the second operation acting on the at least one first combination with the mathematically identical expression using at least one of the processor and system memory, wherein re-expressing the combination with the mathematically identical expression includes treating the first operation as a variable and computing a remainder of the mathematically identical expression to yield a simplified expression as applied to the first operation;
   calculating the mathematically identical expression for the presented mathematical expression using at least one of the processor and system memory;
   displaying the calculated mathematically identical expression in the math software application on a computer display such that a computer user can interact with and implement the calculated mathematically identical expression within the math software application;
   receiving user input at the math software application indicating that the calculated mathematically identical expression is to be used to calculate the presented mathematical expression which includes the first operation and the second operation;
   calculating the presented mathematical expression using the calculated mathematically identical expression using at least one of the processor and system memory; and
   displaying the calculated presented mathematical expression within the math software application on the computer display such that the user is presented with a solution to the presented mathematical expression, the solution being the result of calculations which are otherwise unmanageable without the calculated mathematically identical expression.

2. The method of claim 1, further comprising the step of evaluating the at least one first operation to determine if the first operation will result in a computational effort exceeding a predetermined computational effort threshold before evaluating the second operation.

3. The method of claim 1, wherein computing a remainder of the mathematically identical expression to yield a simplified expression as applied to the first operation includes one of:
   (a) re-expressing n k % m with ((a % m)*(b % m)) % m, where % represents a modulus division operator, n k represents the first operation, % m represents the second operation, and a and b are factors of n k;
   (b) re-expressing n! % in as zero, where % represents a modulus division operator, n! represents the first operation, % m represents the second operation, and
   (c) re-expressing (n−1)! % n as n−1, where % represents the modulus division operator, (n−1)! represents the first operation, % n represents the second operation, and n is a prime number;
   (d) re-expressing (n−1)! % n as zero, where % represents the modulus division operator, (n−1)! represents the first operation, % n represents the second operation, and n is neither a prime number nor equal to four;
   (e) re-expressing log(b, b{circumflex over (n)}) as n, where b{circumflex over (n)} represents the first operation, log(b, b{circumflex over (n)}) represents the second operation, b is a positive real number and n is an integer;
   (f) re-expressing log(b, b {circumflex over (n)}) as −1, where b{circumflex over (n)} represents the first operation, log(b, b{circumflex over (n)}) represents the second operation, and n is negative one;
   (g) re-expressing log(b{circumflex over (n)}, b) as 1/n, where b n represents the first operation, log(b n, b) represents the second operation, b is a positive real number and n is an integer;
   (h) re-expressing log(b m, b n) as n/m, where b m and b n represent the first operation, log(b m, b n) represents the second operation, and m is nonzero;
   (i) re-expressing gcd(m, n) as gcd(m, n % m), where gcd represents a greatest common divisor operation, n represents the first operation, and gcd(m, n) represents the second operation);
   (j) re-expressing n!/m! as n*(n−1)*(m+1), where n>m, n! and m! represent the first operations and n!/m! represents the second operation; and
   (k) re-expressing permutation(m, n) as n!/(n−m)!, where m and n represent the first operation, and permutation(m, n) represents the second operation.

4. The method of claim 1, wherein computing a remainder of the mathematically identical expression to yield a simplified expression as applied to the first operation includes replacing the first operation according to arithmetic rules including one of:
   (a) re-expressing n−n as zero; and (b) re-expressing n/n as one, when n is nonzero.

5. The method of claim 1, wherein computing a remainder of the mathematically identical expression to yield a simplified expression as applied to the first operation includes cascading the second operation down to redistribute the first operation to replaces computation of values with computation of smaller values.

6. The method of claim 1, further comprising the step of attempting to calculate the value of the simplified expression as applied to the first operation.

7. The method of claim 1, further comprising iteratively evaluating each additional operation that is presented by one of:
(a) the presented mathematical expression; and
(b) the mathematically identical expression resulting from the re-expressing of the presented mathematical expression.

8. The method of claim 1, wherein the presented mathematical expression is logically represented in a top-down, tree fashion where operations to be performed first according to the rules of precedence of operators are presented at the bottom of the tree.

9. The method of claim 8, wherein the presented mathematical expression is evaluated using a top-down approach to determine whether any of the operations on the bottom of the tree are incalculable by the computer system.

10. The method of claim 9, further comprising replacing any incalculable operations at the bottom of the tree with calculable expressions that yield the same result according to algebraic identities.

11. At a computer system including a processor, system memory and a computer-readable storage medium, the computer-readable storage medium having stored thereon computer-executable instructions that, when executed by the processor and/or system memory, perform a method of calculating a presented mathematical expression in a math software application, where the presented mathematical expression includes at least one first operation and a second operation where the first operation is calculated before the second operation according to rules of precedence of operators, the math software application being configurable to provide mathematically identical expressions that permit the computer system to perform calculations that are otherwise unmanageable by the computer system, the method comprising the steps of:
evaluating the at least one first operation to determine if the first operation will result in a computational effort exceeding a predetermined computational effort threshold before evaluating the second operation;
evaluating the second operation to determine if a combination of the second operation acting on the at least one first operation is replaceable with a mathematically identical expression to replace computation of values with computation of smaller values;
re-expressing the combination of the second operation acting on the at least one first combination with the mathematically identical expression, wherein re-expressing the combination with the mathematically identical expression includes treating the first operation as a variable and computing the rest of the mathematical expression to yield a simplified expression in as applied to the first operation;
calculating the mathematically identical expression for the presented mathematical expression;
displaying the calculated mathematically identical expression in the math software application on a computer display such that a computer user can interact with and implement the calculated mathematically identical expression within the math software application;
receiving user input at the math software application indicating that the calculated mathematically identical expression is to be used to calculate the presented mathematical expression which includes the first operation and the second operation;
calculating the presented mathematical expression using the calculated mathematically identical expression; and
displaying the calculated presented mathematical expression within the math software application on the computer display such that the user is presented with a solution to the presented mathematical expression, the solution being the result of calculations which are otherwise unmanageable without the calculated mathematically identical expression.

12. The method of claim 11, wherein computing a remainder of the mathematically identical expression to yield a simplified expression as applied to the first operation includes one of:
(a) re-expressing n k % m with ((a % m)*(b % m)) % m, where % represents a modulus division operator, n k represents the first operation, % m represents the second operation, and a and b are factors of n k;
(b) re-expressing n! % m as zero, where % represents a modulus division operator, n! represents the first operation, % m represents the second operation, and m<=n;
(c) re-expressing (n−1)! % n as n−1, where % represents the modulus division operator, (n−1)! represents the first operation, % n represents the second operation, and n is a prime number;
(d) re-expressing (n−1)! % n as zero, where % represents the modulus division operator, (n−1)! represents the first operation, % n represents the second operation, and n is neither a prime number nor equal to four;
(e) re-expressing log(b, b n) as n, where b n represents the first operation, log(b, b n) represents the second operation, b is a positive real number and n is an integer;
(f) re-expressing log(b, b n) as −1, where b n represents the first operation, log(b, b n) represents the second operation, and n is negative one;
(g) re-expressing log(b n, b) as 1/n, where b n represents the first operation, log(b n, b) represents the second operation, b is a positive real number and n is an integer;
(h) re-expressing log(b m, b n) as n/m, where b m and b n represent the first operation, log(b m, b n) represents the second operation, and m is nonzero;
(i) re-expressing gcd(m, n) as gcd(m, n % m), where gcd represents a greatest common divisor operation, n represents the first operation, and gcd(m, n) represents the second operation);
(j) re-expressing n!/m! as n*(n−1)*(m+1), where n>m, n! and m! represent the first operation, and n!/m! represents the second operation; and
(k) re-expressing permutation(m, n) as n!/(n−m)!, where m and n represent the first operation, and permutation(m, n) represents the second operation.

13. The method of claim 11, wherein operation as a variable and computing a remainder of the mathematically identical expression to yield a simplified expression as applied to the first operation includes replacing the first operation according to arithmetic rules including one of:
(a) re-expressing n−n as zero; and
(b) re-expressing n/n as one, when n is nonzero.

14. The method of claim 11, wherein computing a remainder of the mathematically identical expression to yield a simplified expression as applied to the first operation includes cascading the second operation down to redistribute the first operation to replaces computation of values with computation of smaller values.

15. The method of claim 11, further comprising the step of attempting to calculate the value of the simplified expression as applied to the first operation.

16. The method of claim 11, further comprising iteratively evaluating each additional operation that is one of:
(a) presented in the original mathematical expression; and
(b) included in the substitute expression as a result of re-expressing the mathematical expression.

17. A system for calculating a presented mathematical expression in an engineering software application including at least one first operation and a second operation where the first operation is calculated before the second operation according to rules of precedence of operators, the engineering software application being configurable to provide mathematically identical expressions that permit the system to perform calculations that are otherwise unmanageable by the system, the system comprising:
at least one user input device;
a processor in communication with the input device and the display;
a memory in communication with the processor, the memory storing data and machine instructions that cause the processor to carry out a plurality of functions, including:
evaluating the at least one first operation to determine if the first operation will result in a computational effort exceeding a predetermined computational effort threshold before evaluating the second operation;
evaluating the second operation to determine if a combination of the second operation acting on the at least one first operation is replaceable with a mathematically identical expression to replace computation of values with computation of smaller values;
re-expressing the combination of the second operation acting on the at least one first combination with the mathematically identical expression, wherein re-expressing the combination with the mathematically identical expression includes treating the first operation as a variable and computing a remainder of the mathematical identical expression to yield a simplified expression in as applied to the first operation; and
calculating the mathematically identical expression for the presented mathematical expression;
receiving user input at the engineering software application indicating that the calculated mathematically identical expression is to be used to calculate the presented mathematical expression which includes the first operation and the second operation;
calculating the presented mathematical expression using the calculated mathematically identical expression
a display for displaying the calculated mathematically identical expression in the engineering software application on a computer display such that a computer user can interact with and implement the calculated mathematically identical expression within the engineering software application and displaying the calculated presented mathematical expression within the engineering software application such that the user is presented with a solution to the presented mathematical expression, the solution being the result of calculations which are otherwise unmanageable without the calculated mathematically identical expression.

18. The system of claim 17, wherein the machine instructions further cause the processor to evaluate the at least one first operation to determine if the first operation will result in a computational effort exceeding a predetermined computational effort threshold before evaluating the second operation.

* * * * *